(12) United States Patent
Gao et al.

(10) Patent No.: US 11,755,395 B2
(45) Date of Patent: Sep. 12, 2023

(54) METHOD, EQUIPMENT AND COMPUTER PROGRAM PRODUCT FOR DYNAMIC STORAGE RECOVERY RATE

(71) Applicant: EMC IP Holding Company LLC, Hopkinton, MA (US)

(72) Inventors: Hongpo Gao, Beijing (CN); Jian Gao, Beijing (CN); Shaoqin Gong, Beijing (CN); Baote Zhuo, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 17/469,348

(22) Filed: Sep. 8, 2021

(65) Prior Publication Data

US 2022/0237082 A1 Jul. 28, 2022

(30) Foreign Application Priority Data

Jan. 22, 2021 (CN) .......................... 202110088242.0

(51) Int. Cl.
*G06F 11/07* (2006.01)
*G06F 11/00* (2006.01)
*G06F 11/14* (2006.01)

(52) U.S. Cl.
CPC ........ *G06F 11/0727* (2013.01); *G06F 11/008* (2013.01); *G06F 11/0793* (2013.01); *G06F 11/1469* (2013.01)

(58) Field of Classification Search
CPC ............... G06F 11/008; G06F 11/0727; G06F 11/0793; G06F 11/1084; G06F 11/1469; G06F 3/0617; G06F 3/0631; G06F 3/0689
See application file for complete search history.

(56) References Cited

U.S. PATENT DOCUMENTS

| 5,495,572 A | * | 2/1996 | Tanaka | G06F 11/1084 714/25 |
| RE36,846 E | * | 8/2000 | Ng | G06F 11/1092 714/6.12 |
| 8,689,040 B2 | | 4/2014 | Kidney et al. | |
| 10,282,260 B2 | | 5/2019 | Lee et al. | |
| 11,210,022 B2 | | 12/2021 | Ma et al. | |
| 2013/0205166 A1 | * | 8/2013 | Nair | G06F 11/1092 714/E11.122 |

(Continued)

*Primary Examiner* — Bryce P Bonzo
*Assistant Examiner* — Albert Li
(74) *Attorney, Agent, or Firm* — BainwoodHuang

(57) ABSTRACT

Techniques for storage management involve determining, based at least on an upper limit duration for recovering a predetermined number of disk sets among a plurality of disk sets, a first recovery rate for recovering at least a portion of the plurality of disk sets. The techniques may further involve determining the number of disk sets that are not recovered based on the first recovery rate among the plurality of disk sets. In addition, the techniques may further involve performing data recovery on unrecovered disk sets among the plurality of disk sets based on a predetermined second recovery rate according to the determined number being less than or equal to the predetermined number, the second recovery rate being lower than the first recovery rate and being associated with the upper limit duration. Accordingly, it can be ensured that all to-be-recovered disk sets may be recovered within a recovery duration.

13 Claims, 5 Drawing Sheets

(56) References Cited

U.S. PATENT DOCUMENTS

| | | | |
|---|---|---|---|
| 2019/0129795 A1* | 5/2019 | Xu | G06F 11/1088 |
| 2020/0285551 A1* | 9/2020 | Fujii | G06F 11/1076 |
| 2021/0157695 A1 | 5/2021 | Tal | |
| 2022/0413965 A1* | 12/2022 | Xu | G06F 11/3419 |

\* cited by examiner

METHOD, EQUIPMENT AND COMPUTER PROGRAM PRODUCT FOR DYNAMIC STORAGE RECOVERY RATE

CROSS-REFERENCE TO RELATED APPLICATION

This application claims priority to Chinese Patent Application No. CN202110088242.0, on file at the China National Intellectual Property Administration (CNIPA), having a filing date of Jan. 22, 2021, and having "METHOD, EQUIPMENT AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate to the field of data storage, and more particularly, to a method, a device, and a computer program product for storage management.

BACKGROUND

A disk array, such as a redundant array of independent disks (RAID), is a disk group composed of a plurality of independent disks combined in a certain way. From a user's perspective, the RAID is like one disk, which may provide a higher storage capacity than a single hard disk, and may also provide data backup. When data in a disk area is damaged, the data backup may also be used to recover the damaged data, thereby protecting the security of user data.

A Uber storage unit has a structure and function similar to those of the RAID and may be considered as a lightweight RAID. When one or more disks in a Uber go offline due to reasons such as poor contact or failure, the Uber needs to be recovered (or called "rebuilt"). If the recovery process is too long, it is difficult to ensure the reliability of a storage system. In addition, since the recovery process requires occupation of system resources, it is expected that the recovery process have as little impact on system performance as possible.

SUMMARY OF THE INVENTION

Embodiments of the present disclosure provide a method, a device, and a computer program product for storage management.

According to a first aspect of the present disclosure, a storage management method is provided. The method may include determining, based at least on an upper limit duration for recovering a predetermined number of disk sets among a plurality of disk sets, a first recovery rate for recovering at least a portion of the plurality of disk sets. The method may further include determining the number of disk sets that are not recovered based on the first recovery rate among the plurality of disk sets. In addition, the method may further include performing data recovery on unrecovered disk sets among the plurality of disk sets based on a predetermined second recovery rate according to the determined number being less than or equal to the predetermined number, the second recovery rate being lower than the first recovery rate and being associated with the upper limit duration.

According to a second aspect of the present disclosure, an electronic device is provided. The electronic device includes: a processor; and a memory, which stores computer program instructions. The processor runs the computer program instructions in the memory to control the electronic device to perform actions. The actions include: determining, based at least on an upper limit duration for recovering a predetermined number of disk sets among a plurality of disk sets, a first recovery rate for recovering at least a portion of the plurality of disk sets; determining the number of disk sets that are not recovered based on the first recovery rate among the plurality of disk sets; and performing data recovery on unrecovered disk sets among the plurality of disk sets based on a predetermined second recovery rate according to the determined number being less than or equal to the predetermined number, the second recovery rate being lower than the first recovery rate and being associated with the upper limit duration.

According to a third aspect of the present disclosure, a computer program product is provided. The computer program product is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
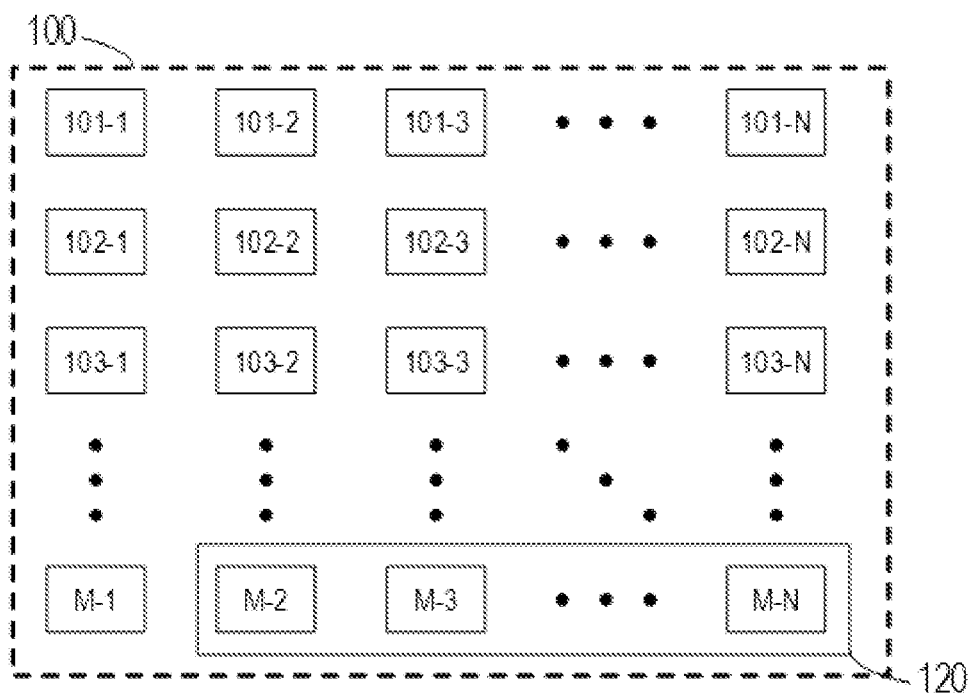
FIG. 1 shows a schematic diagram of a plurality of to-be-recovered disk sets according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

A RAID-based disk set is a storage disk group composed of a plurality of independent disks combined in different ways. When a plurality of disks are stored in association as a disk set, if some of the disks are not available, the disk set needs to be recovered. A recovery duration is usually an important indicator of system reliability. For example, in currently widely used storage systems, it is usually necessary to limit the recovery duration to a certain range, such as within 4.4 hours. Knowing an acceptable recovery duration of the storage system, a recovery rate may be determined based on the recovery duration and a disk capacity of a disk set to be recovered, thereby ensuring that the recovery of all to-be-recovered disk sets may be completed within the recovery duration.

To adjust the recovery rate, the storage system may adjust the number of recovery operations for processing a plurality of disk sets in parallel. For example, when an actual progress of recovery is later than a predetermined progress, a plurality of recovery operations may be initiated in parallel on one or more computing nodes, each recovery operation being used to process a recovery task of one disk set. Therefore, in order to meet the requirements of the recovery duration, considerable system computing resources may be occupied to initiate enough recovery operations in parallel. It should be understood that the system computing resources are usually not excessively occupied to increase the recovery rate, because this will affect the normal use of the system and then degrade the user experience. Therefore, the adjustment for the recovery rate of the disk set must not only meet the requirements of the limited recovery duration, but also minimize the impact of the recovery operations on the system performance.

However, there are some risks in the above recovery method. For example, in some cases, the recovery rate is calculated according to the above method, and the maximum number of concurrent recovery operations may be selected to complete the recovery operations of the disk set within the limited recovery duration, but when the number of the last remaining disk sets is less than the maximum number of concurrency, even if the maximum number of concurrent recovery operations is selected, the recovery rate cannot reach an expected rate. For example, assuming that the maximum number of concurrent recovery operations is 8, when the number of remaining to-be-recovered disk sets is 4, even if 8 recovery operations are selected to recover these 4 disk sets in parallel, the recovery rate cannot reach a rate of recovering 8 disk sets in parallel by the 8 recovery operations. Therefore, the above recovery method may exceed the limited recovery duration, thereby affecting the reliability of the system.

In order to solve the above problems, the present disclosure proposes a new storage management scheme, which subtracts an upper limit duration from a total recovery duration, and determines a recovery rate based on the time difference. The upper limit duration is sufficient to make the last remaining disk sets complete the recovery operations at the lowest or lower recovery rate and does not exceed a limited recovery duration. For a better understanding of a storage management process according to an embodiment of the present disclosure, a disk set to be recovered will be first described below with reference to FIG. 1.

FIG. 1 shows a schematic diagram of a plurality of disk sets 100 to be recovered according to an embodiment of the present disclosure. In FIG. 1, a plurality of disk sets 101-1, 101-2, 101-3, . . . , 101-N, 102-1, 102-2, 102-3, . . . , 102-N, 103-1, 103-2, 103-3, . . . , 103-N, . . . , M-1, M-2, M-3, . . . , M-N (hereinafter collectively referred to as "disk sets 100") are all to-be-recovered disk sets, where N is an integer greater than 1 and less than N, and M is an integer greater than 1 and less than N. It should be understood that each disk set in FIG. 1 includes a plurality of storage disks. Since disk sets 100 are all to-be-recovered disk sets, there are a small number of offline storage disks in each disk set.

It should be understood that the storage disks described above may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a blue-ray disk, a serial-attached small computer system Interface (SCSI) storage disk (SAS), a serial advanced technology attachment (SATA) storage disk, any other magnetic storage devices and any other optical storage devices, or any combination thereof.

It should also be understood that, in order to avoid a more complicated illustration of the idea of the present disclosure, a specific structure in each disk set is not shown in FIG. 1. In fact, each disk set in FIG. 1 may have different types to provide different levels of data redundancy and recovery capabilities. The types of RAIDs include RAID 2, RAID 3, RAID 4, RAID 5, RAID 6, RAID 7, RAID 10, etc. In addition, disk sets of the same RAID type may also have different widths. For example, RAID6 may include 8+2

RAID6 and 16+2 RAID6. The above examples are only for illustrating the present disclosure, rather than limiting the present disclosure.

In addition, as shown in FIG. 1, disk sets 100 may also include remaining disk sets 120. Remaining disk sets 120 are usually generated as a result of a plurality of recovery operations recovering disk sets 100 in parallel. Remaining disk sets 120 and their impact on the recovery duration will be described in detail below with reference to FIG. 2.

Figure 2:
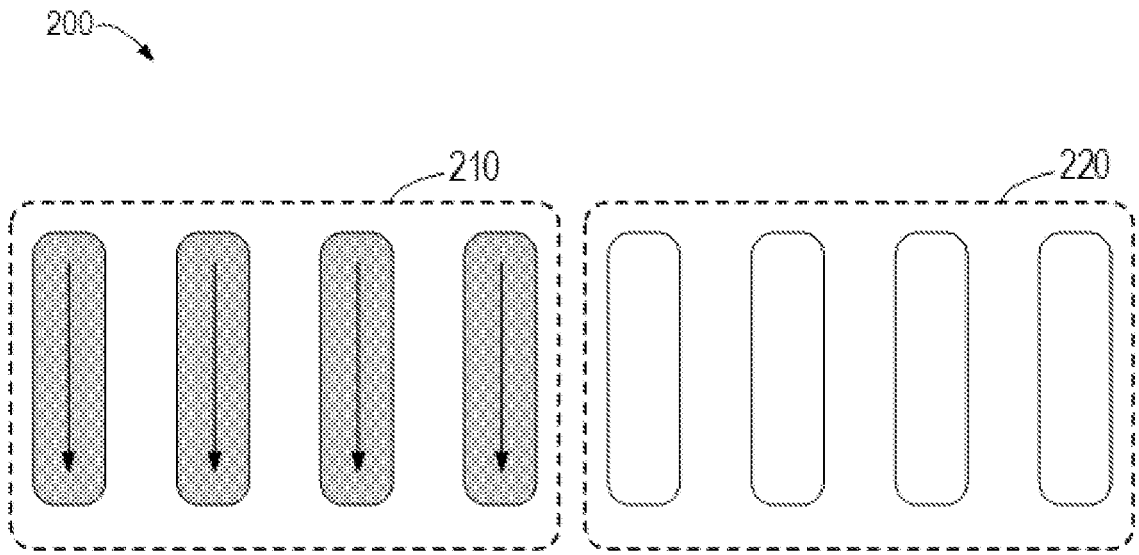
FIG. 2 shows a schematic diagram of computing resources according to an embodiment of the present disclosure.

FIG. 2 shows a schematic diagram of computing resources 200 according to an embodiment of the present disclosure. It should be understood that when time is abundant, each of disk sets 100 may be recovered one by one in a single recovery operation, and no remaining disk sets 120 will be generated in this case. In addition, when the number of disk sets 100 is large and a disk capacity to be recovered is large, a plurality of recovery operations may be initiated in parallel to recover disk sets 100 in parallel. In FIG. 2, assuming that the maximum number of concurrent recovery operations is 8, FIG. 2 shows an example in which 4 recovery operations (i.e., recovery operation group 210) are initiated in parallel to recover disk sets 100 in parallel. At the same time, the remaining computing resources (i.e., potential recovery operation group 220) may be used for a normal system or a host IO. As shown in FIG. 2, 4 disk sets may be recovered in parallel in 4 recovery operations in recovery operation group 210, respectively. If the number of to-be-recovered disk sets in disk sets 100 is not even divisible by 4, remaining disk sets 120 will inevitably be generated. Apparently, the number of remaining disk sets 120 is less than 4 and greater than 0 in this case. Since the number of remaining disk sets 120 is less than the number of parallel recovery operations, the recovery rate of remaining disk sets 120 will be less than an expected rate, resulting in that the recovery duration cannot meet the expected demand.

Figure 3:
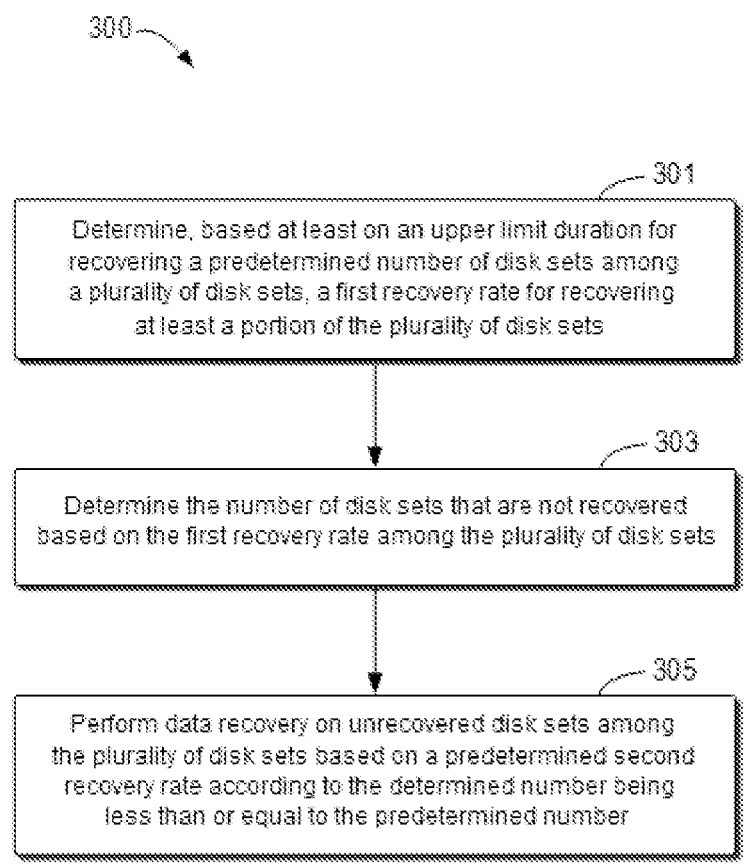
FIG. 3 shows a schematic diagram of a storage management process according to an embodiment of the present disclosure.

For the above problems, the system of the present disclosure may ensure that the recovery duration meets the expected demand by executing the process for storage management as shown in FIG. 3. A flow chart of the process for storage management will be described in detail below with reference to FIG. 3.

FIG. 3 shows a schematic diagram of storage management process 300 according to an embodiment of the present disclosure. In some embodiments, process 300 may be implemented in a device shown in FIG. 6. For ease of understanding, specific data mentioned in the following description are by way of example and are not intended to limit the scope of protection of the present disclosure.

At 301, a first recovery rate may be determined based at least on an upper limit duration for recovering a predetermined number of disk sets among a plurality of disk sets (e.g., disk sets 100 in FIG. 1) for recovering at least a portion of the plurality of disk sets. As an example, the predetermined number may be the maximum number of concurrent recovery operations. In order to further minimize the impact on system performance, the predetermined number may be slightly smaller than the maximum number of concurrent recovery operations, for example, the maximum number of concurrent recovery operations reduced by one.

Figure 4:
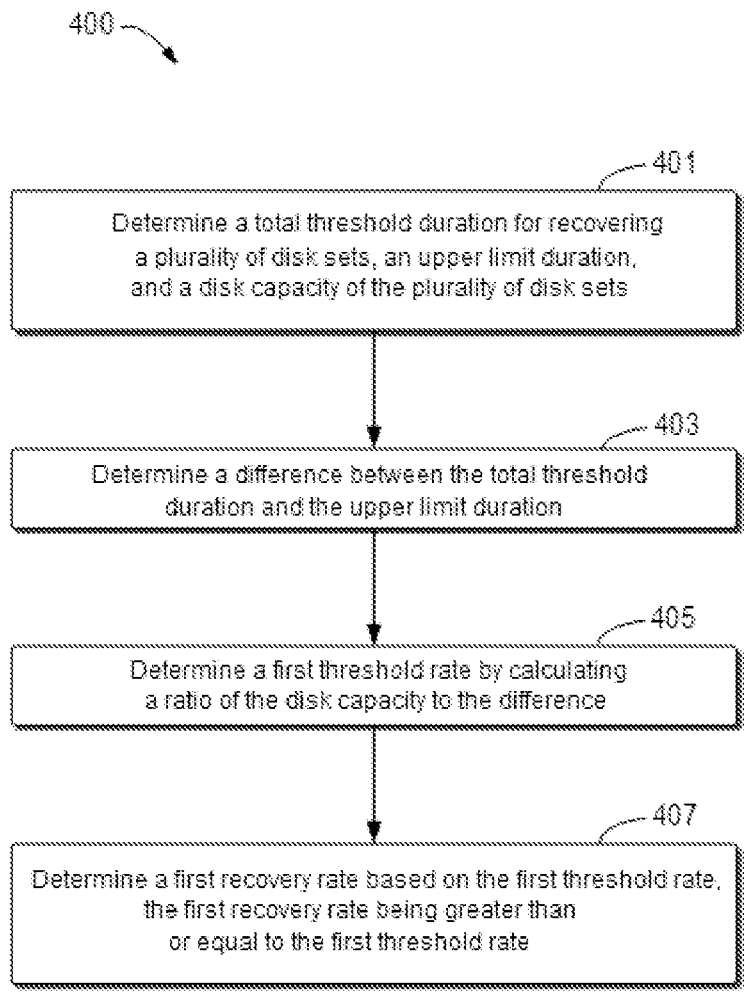
FIG. 4 shows a schematic diagram of a process of determining a first recovery rate according to an embodiment of the present disclosure.

It should be understood that the reason why the first recovery rate is determined based on the upper limit of the recovery duration of the predetermined number of disk sets is that time has to be reserved for the recovery operation of remaining disk sets 120 with a lower recovery rate. Specifically, the upper limit duration may be subtracted from a total threshold duration, so as to determine the first recovery rate based on the updated time. FIG. 4 shows a schematic diagram of process 400 of determining a first recovery rate according to an embodiment of the present disclosure.

At 401, a total threshold duration for recovering the plurality of disk sets may be predetermined. For currently widely used storage systems, the threshold duration may be set to 4.4 hours. It should be understood that the duration is only by way of example, and may be changed according to different standards, requirements, or instructions. In addition, an upper limit duration for recovering a predetermined number of disk sets among the plurality of disk sets is also predetermined. As described above, the predetermined number may be associated with the maximum number of concurrent recovery operations. In addition, it is also necessary to predetermine a disk capacity of these to-be-recovered disk sets.

At 403, a difference between the total threshold duration and the upper limit duration may be determined. In other words, the upper limit duration may be subtracted from the total threshold duration, so as to reserve time for the recovery operation of remaining disk sets 120 to be recovered last. Even if the recovery operation of remaining disk sets 120 can only be executed at the lowest recovery rate available from the system, the actually consumed duration for recovering disk sets 100 will not be longer than the predetermined total threshold duration.

At 405, a first recovery rate may be further determined by calculating a ratio of the disk capacity to the time difference. For example, a first threshold rate may be determined based on the ratio first. Thereafter, at 407, the first recovery rate may be determined based on the first threshold rate. In order to ensure that the actually consumed duration for recovering disk sets 100 will not be longer than the predetermined total threshold duration, the first recovery rate needs to be set to be greater than or equal to the first threshold rate. Preferably, the first recovery rate may be directly set to be equal to the first threshold rate, so as to occupy as few system resources as possible, thereby reducing the impact on system performance.

Returning to FIG. 3, after the first recovery rate is determined, at 303, the number of disk sets that are not recovered based on the first recovery rate among the plurality of disk sets may be determined. Then at 305, the determined number of unrecovered disk sets may be compared with the above predetermined number. If the number of unrecovered disk sets is greater than or equal to the predetermined number, the unrecovered disk sets among the plurality of disk sets may be subjected to data recovery based on a predetermined second recovery rate. It should be understood that the second recovery rate is lower than the first recovery rate, and the second recovery rate is associated with the above upper limit duration. As an example, the second recovery rate may be the lowest recovery rate available from the system.

In some embodiments, in order to perform data recovery on the unrecovered disk sets among the plurality of disk sets based on the predetermined second recovery rate, data recovery may be performed on the unrecovered disk sets in a single recovery operation. Since the above upper limit duration is reserved in advance, the recovery of the remaining disk sets with a single recovery operation may still be completed within the predetermined total threshold duration.

Figure 5:
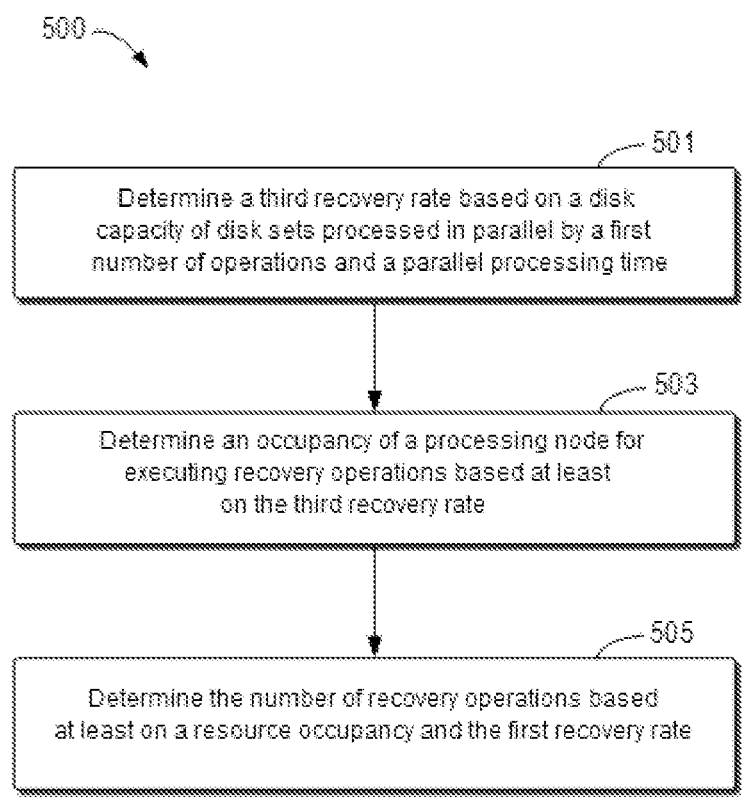
FIG. 5 shows a schematic diagram of a process of determining the number of recovery operations according to an embodiment of the present disclosure.

In some embodiments, the number of recovery operations for processing the plurality of disk sets in parallel may be further determined based at least on the determined first recovery rate. That is, in order to make the recovery process reach the first recovery rate, the number of recovery operations for processing the plurality of disk sets in parallel may be adjusted. FIG. 5 shows a schematic diagram of process 500 of determining the number of recovery operations according to an embodiment of the present disclosure.

At 501, a recovery process may be executed with a first number of parallel operations in a short time period, so as to detect a disk capacity processed by the recovery process, thereby determining a third recovery rate based on the disk capacity and the time period. As an example, the recovery process may be performed in 2 parallel operations for 30 seconds, thereby determining the third recovery rate. It should be understood that both the time period and the first number of parallel operations may be arbitrarily set as required, and only a linear relationship thereof is required to determine the third recovery rate.

At 503, an occupancy of a processing node for executing the recovery operations is determined based at least on the third recovery rate. As an example, the occupancy of the processing node for executing the recovery operations may be determined based on the third recovery rate, the type and width of a disk set being recovered, and the first number of parallel operations.

At 505, the number of recovery operations is determined based at least on the determined resource occupancy and the first recovery rate. As an example, the number of recovery operations may be determined based on the first recovery rate, the type and width of a disk set being recovered, and the determined resource occupancy.

As an example, the above process may be performed by looking up a table. An example lookup table is shown in Table 1 below:

TABLE 1

| 8 + 2 RAID6 | | | | | |
|---|---|---|---|---|---|
| Number of operations | 0% occupied | 25% occupied | 50% occupied | 75% occupied | 100% occupied |
| 1 | 582 | 525 | 492 | 332 | 205 |
| 2 | 927 | 845 | 772 | 553 | 297 |
| 4 | 1051 | 1035 | 1003 | 963 | 956 |
| 8 | 1963 | 1925 | 1874 | 1822 | 1802 |

For example, the recovery process may be performed in 2 parallel operations for a time period, thereby determining the third recovery rate. Assuming that the third recovery rate is determined to be 850 (MB/s) and the disk set being recovered is 8+2 RAID6, a position where the number of parallel operations is 2 and the recovery rate is close to 850 may be found in Table 1, and it may be determined that the occupancy of the processing node for executing the recovery operations is 25% occupied. After that, assuming that the first recovery rate is determined to be 1050 (MB/s), the disk set being recovered is 8+2 RAID6, and the resource occupancy has been determined to be 25%, the number of recovery operations may be determined as 4 by looking up Table 1.

TABLE 2

| 16 + 2 RAID6 | | | | | |
|---|---|---|---|---|---|
| Number of operations | 0% occupied | 25% occupied | 50% occupied | 75% occupied | 100% occupied |
| 1 | 377 | 341 | 319 | 226 | 185 |
| 2 | 602 | 549 | 501 | 409 | 231 |
| 4 | 683 | 672 | 652 | 634 | 630 |
| 8 | 1296 | 1251 | 1235 | 1222 | 1189 |

For another example, the recovery process may be performed in 2 parallel operations for a time period, thereby determining the third recovery rate. Assuming that the third recovery rate is determined to be 550 (MB/s) and the disk set being recovered is 16+2 RAID6, a position where the number of parallel operations is 2 and the recovery rate is close to 550 may be found in Table 1, and it may be determined that the occupancy of the processing node for executing the recovery operations is 25% occupied. After that, assuming that the first recovery rate is determined to be 1250 (MB/s), the disk set being recovered is 16+2 RAID6, and the resource occupancy has been determined to be 25%, the number of recovery operations may be determined as 8 by looking up Table 2.

In this way, the first recovery rate for recovering most disk sets may be quickly determined, and in addition, the recovery of disk sets with different RAID types and different RAID widths may be compatible. It should be understood that due to changes in factors such as processing node occupancy, the above process needs to be performed periodically to adjust the first recovery rate in time.

In addition, alternatively or additionally, a machine learning model may also be trained based on a plurality of calibrated training data sets to determine the first recovery rate for recovering most of the disk sets. For example, the machine learning model may be trained through a plurality of groups of calibrated data including the first recovery rate, the disk set type, the resource occupancy, the number of recovery operations, etc., so that the number of concurrent operations may be determined more finely, so as to adjust the first recovery rate in time.

In addition, in some embodiments, to-be-recovered disk sets may also be sorted, and disk sets with a large number of unusable storage disks and disk sets with a large RAID width may be recovered preferentially, so that disk sets with more unrecoverable risks may be recovered preferentially within a specified total threshold duration.

Through the above embodiment, by reserving time for the recovery operation of the remaining disk sets at a lower recovery rate, it may be ensured that all to-be-recovered disk sets are completed within a recovery duration. In addition, due to the rational use of computing resources, the impact on system performance may be minimized. In addition, the present disclosure creates and maintains a number of look-up tables, and the RAID types and RAID widths of the recovered disk sets may be different, thereby improving the compatibility of the recovery operations.

Figure 6:
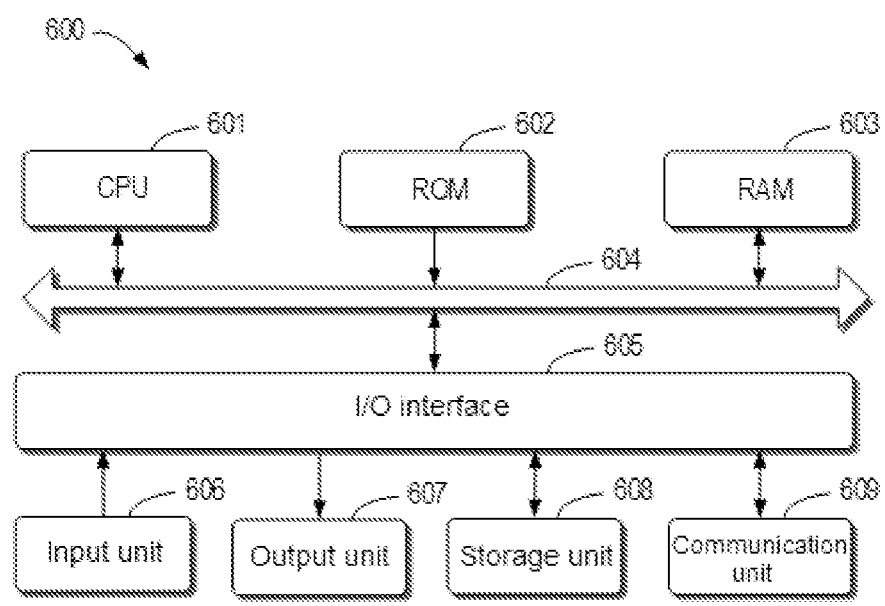
FIG. 6 is a schematic block diagram of an example device applicable to implementing an embodiment of the present disclosure.

FIG. 6 is a schematic block diagram of example device 600 applicable to implementing an embodiment of the present disclosure. As shown in the figure, device 600 includes central processing unit (CPU) 601 that may perform various appropriate actions and processing according to computer program instructions stored in read-only memory (ROM) 602 or computer program instructions loaded from storage unit 608 into random access memory (RAM) 603. In RAM 603, various programs and data required for the operation of the device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as methods 300, 400, and/or 500, may be performed by processing unit 601. For example, in some embodiments, method 300, 400, and/or 500 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded into RAM 603 and executed by CPU 601, one or more actions of methods 300, 400, and/or 500 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, an instruction set architecture (ISA) instructions, machine instructions, machine-related instructions, microcode, firmware instructions, state setting data, or source code or object code written in any combination of one or more programming languages, including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A storage management method, comprising:
   determining, based at least on an upper limit duration for recovering a predetermined number of disk sets among a plurality of disk sets, a first recovery rate for recovering at least a portion of the plurality of disk sets;
   determining a number of disk sets that are not recovered based on the first recovery rate among the plurality of disk sets; and
   performing data recovery on unrecovered disk sets among the plurality of disk sets based on a predetermined second recovery rate according to the determined number being less than or equal to the predetermined number, the second recovery rate being lower than the first recovery rate and being associated with the upper limit duration.

2. The method according to claim 1, wherein determining the first recovery rate comprises:
   determining a total threshold duration for recovering the plurality of disk sets, the upper limit duration, and a disk capacity of the plurality of disk sets;
   determining a difference between the total threshold duration and the upper limit duration;
   determining a first threshold rate by calculating a ratio of the disk capacity to the difference; and
   determining the first recovery rate based on the first threshold rate, the first recovery rate being greater than or equal to the first threshold rate.

3. The method according to claim 1, further comprising:
   determining, based at least on the first recovery rate, a number of recovery operations for processing the plurality of disk sets in parallel.

4. The method according to claim 3, wherein determining, based at least on the first recovery rate, the number of recovery operations comprises:
   determining a resource occupancy of a processing node for executing the recovery operations; and
   determining the number of recovery operations based at least on the resource occupancy and the first recovery rate.

5. The method according to claim 4, wherein determining the resource occupancy comprises:
   determining a third recovery rate based on a disk capacity of disk sets processed in parallel by a first number of operations and a parallel processing time; and
   determining the resource occupancy of the processing node for executing the recovery operations based at least on the third recovery rate.

6. The method according to claim 1, wherein performing the data recovery comprises:
   performing data recovery on the unrecovered disk sets in a single recovery operation.

7. An electronic device, comprising:
   at least one processing unit; and
   at least one memory, coupled to the at least one processing unit and storing machine-executable instructions that, when executed by the at least one processing unit, cause the device to perform actions comprising:
      determining, based at least on an upper limit duration for recovering a predetermined number of disk sets among a plurality of disk sets, a first recovery rate for recovering at least a portion of the plurality of disk sets;
      determining the number of disk sets that are not recovered based on the first recovery rate among the plurality of disk sets; and
      performing data recovery on unrecovered disk sets among the plurality of disk sets based on a predetermined second recovery rate according to the determined number being less than or equal to the predetermined number, the second recovery rate being lower than the first recovery rate and being associated with the upper limit duration.

8. The device according to claim 7, wherein determining the first recovery rate comprises:
   determining a total threshold duration for recovering the plurality of disk sets, the upper limit duration, and a disk capacity of the plurality of disk sets;
   determining a difference between the total threshold duration and the upper limit duration;
   determining a first threshold rate by calculating a ratio of the disk capacity to the difference; and
   determining the first recovery rate based on the first threshold rate, the first recovery rate being greater than or equal to the first threshold rate.

9. The device according to claim 7, wherein the actions further comprise:
   determining, based at least on the first recovery rate, the number of recovery operations for processing the plurality of disk sets in parallel.

10. The device according to claim 9, wherein determining, based at least on the first recovery rate, the number of recovery operations comprises:
    determining a resource occupancy of a processing node for executing the recovery operations; and
    determining the number of recovery operations based at least on the resource occupancy and the first recovery rate.

11. The device according to claim 10, wherein determining the resource occupancy comprises:
    determining a third recovery rate based on a disk capacity of disk sets processed in parallel by a first number of operations and a parallel processing time; and
    determining an occupancy of a processing node for executing the recovery operations based at least on the third recovery rate.

12. The device according to claim 7, wherein performing the data recovery comprises:
    performing data recovery on the unrecovered disk sets in a single recovery operation.

13. A computer program product having a non-transitory computer readable medium which stores a set of instructions to perform storage management; the set of instructions, when carried out by computerized circuitry, causing the computerized circuitry to perform a method of:
- determining, based at least on an upper limit duration for recovering a predetermined number of disk sets among a plurality of disk sets, a first recovery rate for recovering at least a portion of the plurality of disk sets;
- determining the number of disk sets that are not recovered based on the first recovery rate among the plurality of disk sets; and
- performing data recovery on unrecovered disk sets among the plurality of disk sets based on a predetermined second recovery rate according to the determined number being less than or equal to the predetermined number, the second recovery rate being lower than the first recovery rate and being associated with the upper limit duration.

* * * * *